United States Patent [19]

Pellegrino et al.

[11] Patent Number: 5,258,202
[45] Date of Patent: Nov. 2, 1993

[54] METHODS OF MAKING AND USING IMPROVED MICROPOROUS HOLLOW FIBERS, THE IMPROVED HOLLOW FIBERS AND TUBE BUNDLES CONSTRUCTED OF THE IMPROVED FIBERS

[75] Inventors: John J. Pellegrino, Boulder; Myong K. Ko, Louisville, both of Colo.; Paul J. Marko, Idaho Falls, Id.

[73] Assignee: The United States of America as represented by the Secretary of Commerce, Washington, D.C.

[21] Appl. No.: 591,634

[22] Filed: Oct. 2, 1990

[51] Int. Cl.⁵ .............................................. B05D 7/22
[52] U.S. Cl. ...................................... 427/235; 427/243; 427/244; 427/322; 427/377; 427/430.1
[58] Field of Search ............... 427/235, 244, 243, 322, 427/336, 238, 230, 430.1, 377

[56] References Cited

U.S. PATENT DOCUMENTS

| 3,874,899 | 4/1975 | Miszenti et al. | 427/243 |
| 4,014,798 | 3/1977 | Rembaum | 210/500 M |
| 4,187,333 | 2/1980 | Rembaum et al. | 427/244 |
| 4,211,602 | 7/1980 | Brumfield | 210/321.86 |
| 4,214,020 | 7/1980 | Ward et al. | 210/490 |
| 4,469,744 | 9/1984 | Grot et al. | 210/679 |
| 4,711,793 | 12/1987 | Ostreicher et al. | 427/244 |
| 4,806,246 | 2/1989 | Nomura | 210/490 |
| 4,908,235 | 3/1990 | Smolders | 427/244 |
| 5,082,472 | 1/1992 | Mallouk et al. | 55/16 |

Primary Examiner—Janyce Bell
Attorney, Agent, or Firm—Thomas P. Pavelko

[57] ABSTRACT

The processes of the invention enable depositable PFSA to be provided over the entire inner surface of hollow fibers. Additionally, the processes of this invention provide a fiber which is coated by a thin coating of PFSA which is approximately 5–40 $\mu$m thick. The fiber can advantageously withstand pressure gradients between 20–75 psig throughout its wall before leakage.

17 Claims, 1 Drawing Sheet

METHODS OF MAKING AND USING IMPROVED MICROPOROUS HOLLOW FIBERS, THE IMPROVED HOLLOW FIBERS AND TUBE BUNDLES CONSTRUCTED OF THE IMPROVED FIBERS

The invention described herein may be manufactured, used and licensed by or for the Government for Governmental purposes without payment to us of any royalties thereon.

BACKGROUND OF THE INVENTION

1. Field of the Invention

Microporous hollow fibers have many uses, for example for fluid and gas separation. Bundles of hollow fibers, which share a common header for incoming feed material, can be enclosed in a cylindrical vessel to separate both gases and liquids. The present invention is directed to a process of making and using improved microporous hollow fibers and tube bundles employing them.

2. Background of the Invention

U.S. Pat. No. 4,214,020 to Ward et al. discloses a coating for the exteriors of a plurality of hollow fibers which are suitable for fluid separation and which are assembled in the form of a bundle. The process includes the step of immersing the bundle of hollow fibers in a coating liquid containing material which is suitable for forming the coating. A pressure drop from the exterior to the interior of the hollow fibers results in the formation of a deposit on the exterior of the hollow fibers.

U.S. Pat. No. 4,806,246 to Nomura discloses a hydrophobic microporous membrane substrate which can be coated with a plasma polymerization coating. This coating reduces the pore size of the substrate to a size smaller than the original pore size but not less than 10 Å. The plasma polymerization activates a monomer precursor into a high energy, dissociated form enriched with radicals, electrons, and ions and deposits a plasma polymer thereof onto the surface of the substrate moving through the glow zone. Nomura thus coats the exterior surface of the hollow fibers.

U.S. Pat. No. 3,874,899 to Miszenti et al. discloses the preparation of a semi-permeable membrane suitable for gas separations wherein a microporous layer of alumina is deposited on the inside of a sintered porous alumina tube by passing an aqueous suspension of the alumina through the inside of the tube and filtering the suspension through the walls of the tube.

U.S. Pat. No. 4,014,798 to Rembaum discloses the preparation of a porous hollow fiber which is impregnated with a polymer having quaternary amine sites. Rembaum discloses that the mixture of polymerized monomers extrudes through the pores of the walls and that excess particles blocking the central passage are removed by forcing liquid through the bore of the fiber.

U.S. Pat. No. 4,211,602 to Brumfield discloses blood dialyzers in which hollow fibers are potted in plastic tube sheets, and the tube sheets are then cut to form a manifold surface providing access to the interior of the hollow fibers.

Each of the foregoing are incorporated in their entirety by reference.

Polyperfluorosulfonic acid (PFSA) is an ion-exchange polymer which is available in flat sheet. PFSA is also available in solvent mixtures. PFSA sheet films are available from Dupont in thicknesses as low as 28 to 30 $\mu$m.

Commercial ventures such as Perma-Pure manufacture and sell devices constructed of tubes of PFSA. These devices have wall thicknesses of approximately 130 to 150 $\mu$m and outside diameters 1,680 $\mu$m supported with an outside mesh of various materials.

PFSA is a very expensive polymer and thus it is desirable to use it in very thin thicknesses. However, none of the commercial suppliers have succeeded in manufacturing hollow fibers of the size typically used in hollow fiber membrane devices with outside diameters of about 240 $\mu$m, wall thickness 30 $\mu$m.

Fibers available as commercial products for hollow fiber membranes and devices include "CELGARD X-20" which is manufactured by Hoechst-Celanese. These fibers are available in commercial modules with several thousand fibers "potted" in a plastic shell equipped with the appropriate plumbing connections.

None of prior art provides a satisfactory solution to the problem of efficient gas to fluid separation. By means of the present invention, it is now plausible to assemble PFSA coated fibers into a tube bundle without destroying the coating. No one has previously attempted to coat the inside of an organic hollow fiber with PFSA. The high pressure side of separation is usually carried out on the inside of the fiber, and, thus, the exertion of pressure on the coated PFSA film is braced by the fiber wall in an expansion direction. Thus, the present invention avoids the risk of prior art coated fibers where the coating could be blown off. Conversely, if the high pressure is applied to the outside of a fiber coated on the outside as in the prior art in order to prevent the coating from being blown off, the hollow fiber could collapse. Thus, the present invention solves the foregoing problems and provides further advantages over the prior art as will become apparent from the following description.

OBJECTS OF THE INVENTION

It is an object of the invention to provide improved microporous hollow fibers. It is also an object of the invention to provide an improved method for making the improved microporous hollow fibers. A further object includes the provision of a plurality of the improved hollow fibers in a single device.

In a further embodiment of the invention, an improved method of gas/fluid separation can be attained using the improved microporous hollow fiber coated device. These and other objects will become more apparent in view of the following descriptions taken in connection with the drawings.

The above and other objects, advantages and features of the invention will be more fully understood when considered in conjunction with the following discussion in the attached drawings.

DESCRIPTION OF THE PREFERRED EMBODIMENT

It has been found that the processes of this invention may be suitable for applying a depositable material to form a deposit on the inside of fibers. The processes of the invention enable depositable PFSA to be provided over the entire inner area of the hollow fibers, importantly the processes of this invention provide a fiber which is coated by a thin coating of PFSA which is approximately 5–40 μm thick. A fiber can advantageously withstand pressure gradients between 20–75 psig throughout its wall before leakage. Because of the relatively thin coat of PFSA on the inner cylindrical area of the fiber, a significantly smaller amount of PFSA coats the inner cylindrical area without sacrificing leakage. This occurs because the outer surface of a cylinder has a greater surface area than the inside surface area. By using the processes of the present invention, the coated fiber is superior to fibers which are coated on the outside. By using the processes of the invention, the fibers are not subject to damaging rupture. The inner cylindrical surface of the hollow fiber to which the coating of PFSA is attached provides strength which prevents the coating from expanding and which prevents the coating from rupturing.

Figure 1:
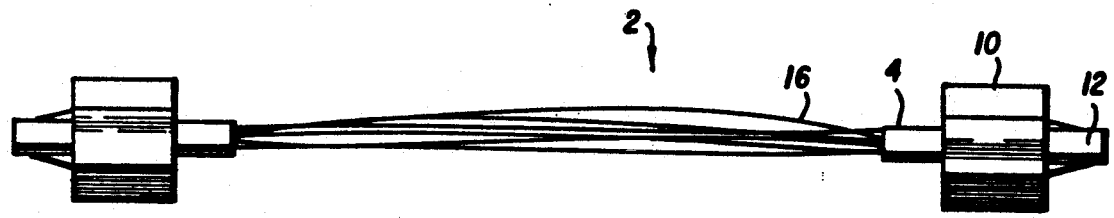
FIG. 1 is a side view of a six fiber test module.
Figure 2:
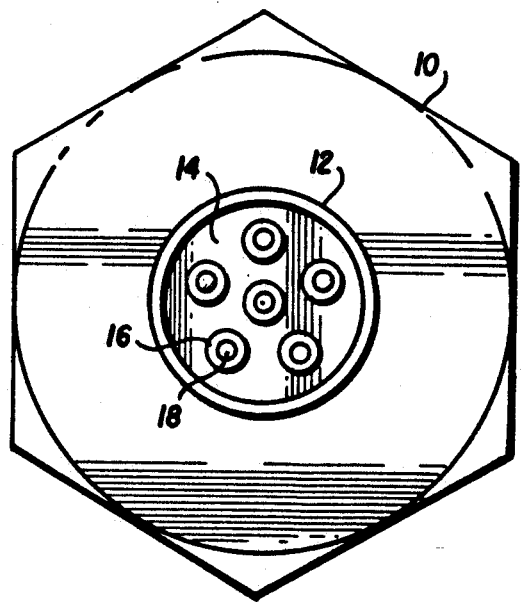
FIG. 2 is an end view of the six fiber test module of FIG. 1.

The inventors are the first to discover that the foregoing objects, not previously obtainable by the prior art can be achieved by the present invention. FIG. 1 shows a conventional test module 2 comprising six individual hollow filaments 16, the ends of hollow filaments are potted in ¼" stainless steel tubing 4 with ferrules 12 and nuts 10 attached. It is to be understood that the foregoing test module is not valuable technology as far more sophisticated modules are already commercially available. However, it is to be understood that the principle described in connection with the test module containing six hollow fibers can be applied to fiber modules containing many thousands of hollow fibers, e.g., from 2000 fibers to several thousand fibers.

In one embodiment of the invention, each of the hollow fibers 16 are threaded with thin polyester monofilament (fishing line) prior to potting. The end of the fibers are bound to each other end to the stainless steel tubing 4 by a potting compound 14, preferably epoxy. The next step in the production of hollow fibers of the present invention is to coat the inside surface. In a preferred embodiment, the coating is a polymeric substance. A particularly preferred polymeric substance is an ion exchange polymer of PFSA. PFSA is commercially available, notably from Dupont under the tradename "NAFION". It is to be understood that other coatings may also be employed depending on the intended use.

Any polymers which can be solubilized in a volatile solvent could be used for coating in this fashion, such as: polysulfone, polyacrylonitrile, silicone polymers, cellulose and its various esters, polysaccharides, such as chitosan, polyetherimides, elastomers, and nylons.

In one embodiment of the invention, the coating technique consists of passing fluids through the hollow fiber as follows:

1. flowing methanol through the fiber
2. flowing water through the fiber
3. preparing a mixture of PFSA solution and methanol
4. controllable flowing the PFSA solution through one end of the fiber.
5. subsequently reversing the direction of flow of PFSA solution.
6. subsequently flowing an inert gas, such as $N_2$, through the fiber, first applied in one direction and then the other direction.

It is to be understood that one or more of the foregoing steps may be repeated a number of times in order to obtain a coating of the desired thickness. The thus coated fiber is preferably dried with circulation of air about the outside.

Applicants have found that an improved uniform coating thickness can be achieved if the hollow fiber is placed in the vertical direction before the coating procedure starts. Although the foregoing procedure of coating has been explained with reference to a single hollow fiber, it is be understood that a plurality of potted hollow fibers, assembled into or partly assembled into a tube bundle may be simultaneously coated according to the above disclosed method.

It is to be further understood that both the flow rate and the time of flow are variables which can be controlled to vary the properties of the resulting coating. It is also understood that those of ordinary skill in the art will be able to vary these parameters to achieve coating of different properties than those described herein. Examples of specific flow rates and times can be found in Table 1 with the resultant thereof reported in Table 2.

TABLE 1

| Trial | MeOH | Water/NaOH | PFSA | Drying | Rate[6] |
|---|---|---|---|---|---|
| 1 | | | 5% 3'/3' | natural/$N_2$(1–2 psi) | 1 |
| 2 | 10"[1] | water-90" | 5% 20" | natural | 1 |
| 3 | 20" | water-30" | 5% 20" | natural | 1 |
| | 15" | water-30" | 2.5% 30" | natural | |
| 4 | 25" | water-5' | 2.5% 45" | air through using reverse pump natural dry[3] | 1 |
| 5 | | | 5% | natural dry | 1 |
| | | | 2.5% 60" | natural dry | |
| 6 | 20" | water-40" | 2.5% 2.5% 15"/15"[4] | natural dry | 1 |
| 7 | 15"[2] | water-15' | 5%/5% 2'/2' | vacuum oven dry | 1 |
| 8 | 20' | water-20' | 5%/5% 5.5'/5.5' | $N_2$ purge 15'/15' | 1 |
| 9 | 15' | water-10' | 5%/5% 5'/5' | $N_2$ purge 10'/10' | 1 |
| 10 | 15' | 0.5M NaOH 10' | 5%/5% 5'/5' | $N_2$ purge 10'/10' | 1 |
| 11 | 10' | water-15' | 3.5%/3.5% 5'/5' | $N_2$ purge 15'/35' | 1 |
| 13 | 10' | water-10' | 2.5%/2.5% 5'/5' | $N_2$ purge 20'/20' | 1 |
| 14 | 10' | water-10' | 2.5'/2.5% 5'/5' | $N_2$ purge 20'/20' | 1 |
| 15 | 10' | water-10' | 3.5%/3.5% 5'/5' | $N_2$ purge 35'/15' | 1 |
| 16 | 5' | water-10' | 2.5%/2.5% 3'/3' | $N_2$ purge passage + 3'/3' | 1 |
| 17 | 5' | water-10' | 2.5%/2.5% 3'/3' | $N_2$ purge passage + 0'/0' | 1 |
| 18 | 5' | water-10' | 2.5%/2.5% 3'/3' | $N_2$ purge passage + 10'/10' | ·1 |
| 19 | 5' | water-10' | 2.5%/2.5% 3'/3' | $N_2$ purge passage + 3'/3' (5 psi) | 1 |
| 20 | 5' | water-10' | 2.5%/2.5% 1'/1' | $N_2$ purge passage + 3'/3' | 1 |
| 21 | 5' | water-10' | 2.5%/2.5% 5'/3' | $N_2$ purge passage + 3'/3' | 1 |
| 22 | 5' | water-10' | 2.5%/2.5% 3'/1' | $N_2$ purge passage + 3'/3' | 1 |
| 23 | 5' | water-10' | 2.5%/2.5% 5'/5' | $N_2$ purge passage + 3'/3' | 1 |
| 25 | 5' | water-10' | 2.5%/2.5% 5'/5' | $N_2$ purge passage + 3'/3' | 0.75 |

TABLE 1-continued

| Trial | MeOH | Water/NaOH | PFSA | Drying | Rate[6] |
|---|---|---|---|---|---|
| 26 | 5' | water-10' | 2.5%/2.5% 5'/5' | N$_2$ purge passage + 3'/3' | 0.5 |

[1]" indicates seconds
[2]' indicates minutes
[3]Air is pulsed through module by a pump which is attached to the bottom of the module.
[4]This indicates the percentage of PFSA in a mixture of MeOH in one direction, the percentage of PFSA in a mixture of MeOH in the other direction, the time of the first mixture and the time of the second mixture.
[5]Purge passage indicates that the flow of the inert gas continued until the ends of the fiber stopped dripping, and the inert gas continued to flow for the time indicated in a first direction and then a second direction.
[6]This indicates the setting on the peristal and relates to the flow rate of the coating solution.

TABLE 2

Trial
Results of Pressure Tests
Reference test with no coating. Large amounts of bubble formation at 10 psi.

| | |
|---|---|
| 1 & 2 | Showed no improvement. |
| 3 | Extensive leaking at 5 psi over entire length of fibers. |
| 4 | Bubble formation over the entire unit at only ½ psi. |
| 5 | Fibers leaked moderately at 40 psi after the 5% treatment. |
| 6 | About 200 bubbles/min. mostly in the middle section of the fibers from .45 psi to .8 psi. Most bubble formation up to 19 psi. |
| 7 | Small bubbles appear under pressures up to 40 psi. |
| 8 | Small bubbles on surface, particularly on the side of the fibers that received the first coat of "NAFION" at 40 psi only. |
| 9 | Small bubbles on first coat side up to 10 psi with increasing bubble formation up to 40 psi. |
| 10 | Small bubbles appear all over fibers up to 10 psi and get bigger up to 40 psi. |
| 11 | Only a very small amount of bubbles across fibers up to 20 psi. More bubble formation up to 40 psi. |
| 13 | Very small amount of bubble formation up to 10 psi. Leaked at 30 psi. |
| 14 | Very small amount of bubble formation up to 10 psi. Much more bubble formation at 20 up to 40 psi. |
| 15 | Not much bubble formation up to 40 psi. |
| 16 | Small bubbles form at 5 psi, especially on first coat side. Larger bubbles at 10 psi, increasing to 20 psi. |
| 17 | Very much like #16, but bubble formation a little more vigorous. |
| 18 | Very much like #16. |
| 19 | Small bubbles all over up to 15 psi. Larger bubbles at 20 psi. |
| 20 | Large bubbles all over at 5 psi. |
| 21 | Small bubble formation up to 20 psi. |
| 22 | Moderate bubble formation at 10-15 psi. |
| 23 | Medium sized bubbles even at 5 psi, evenly over the fibers. |
| 25 | At 5-10 psi, bubbles only at the ends, except for a few very small ones. 15-20 psi, larger bubbles at ends; still not much bubble formation in the middle ⅓ of the fibers. |
| 26 | Very much like #25. |

Small bubble formation represents what might be expected from normal gas permeation (not leakage) through a thin film of the polymer and then the hollow support fiber's pore before coming out into the surrounding liquid.

It is advantageous that the PFSA form a uniform, continuous coating on the surface of the interior wall of the hollow fiber. If the fiber itself is highly permeable, PFSA will permeate the fiber to a high degree, and as a result the thickness of the coating of PFSA will be dramatically increased.

Likewise, the interior wall of the hollow fiber should be sufficiently porous or made compatible so that the PFSA adheres to the wall of the fiber to assure that the coating does not become dislodged or broken, which would result in leakage from the hollow fiber. An example of a particularly preferred fiber is Hoechst-Celanese's product "CELGARD X-20" which is a microporous hydrophilic polypropylene hollow fiber. A hollow fiber outside diameter of normally 240 μm and a wall surface thickness of approximately 30 μm is suitable. The effective wall-pore size is 0.03 μm and 40 percent of the wall surface is open. The process according to the invention creates a coating which is approximately 5-40 μm thick layer of PFSA on the inner surface of the hollow fiber. The coated fiber can withstand pressure gradients between 20 and 75 psig when the higher pressure is applied on the inside of the fiber.

The coating of PFSA which is placed in the fiber may be placed at any suitable temperature immediately before and during the insertion which is not deleterious to the inside coating of the hollow fibers. The temperature should be sufficiently high to provide the coating liquid with a desirable viscosity for conducting coating processes according to the invention, but not unduly elevated such that either the coating liquid, particularly the depositable material, or the hollow fibers are adversely affected. Preferably, the temperatures of the coating liquid and fibers immediately before and during the processes of the invention are below the boiling liquid temperature, and frequently are within a range of about ambient temperature, which is about 21° C. to about 23° C.

EXAMPLE 1

Fabrication of a Test Module as Shown in FIG. 1

In the preferred embodiment, the hollow fiber is an elongated cylindrical tube which has a annular cross-section, the periphery of the annulus being the outside surface of the fiber. This fiber includes a hollow center section which is cylindrical in shape. The hollow center section creates an inner cylindrical area which is bounded by the inner wall of the fiber. It is to be understood that the inside of the hollow fiber could be any desired shape, i.e., square, hexagonal, etc. It is also to be understood that there are numerous apparatus which can be used to practice the process of the invention. In a normal manufacturing environment, it is to be further understood that thousands of the hollow fibers could be coated together.

A hollow fiber 16 has thin polyester monofilament (fishing line) 18 inserted into one end and threaded or pulled through the entire length of the fiber to insure that the ends of the fiber do not collapse during the following potting process. The ends of the fibers 16 are inserted in ¼" stainless steel tubing 12 which is an elongated cylinder. Epoxy or any other suitable potting material is placed around the ends of the fiber 16 to provide a device which can be the subject of a test. The epoxy holds the ends of the hollow fibers 16 in place and in turn the epoxy is secured to the tubing 12 to create a bundle 10 and nut 10 is secured to the tubing 12, to create a portion of a test module, and each end of the hollow fiber is treated in a similar manner. The bundle consists of between 7" and 14" of fiber which is preferably used in the testing of the invention. The monofilament (fishing line) is removed after potting. For testing purposes, the test module was placed in the vertical direction; thus, one end of the fiber bundle is substantially located over the other end of the fibers in the bundle. Hanging the hollow fiber bundles in the vertical direction eliminates the influence of gravity in the coating of the hollow fibers, but the processes of the invention could be conducted in the horizontal direction. Specifically, if the fiber bundles were placed in the horizontal direction, as PFSA traverses the hollow center of the hollow fiber, gravity would influence the coating of the inner peripheral area of the hollow fiber such that more material of PFSA would drift downwards and provide a thicker coating on the bottom half of the inner peripheral area with respect to the upper half of the inner peripheral area of the hollow fiber.

It is understood to employ the following procedure to obtain an optimal coating. The inner peripheral surface of the hollow tube is contacted with methanol (MeOH) at a constant flow rate of 100 cm/s for at least 10 seconds and at most 15 minutes, next water ($H_2O$) contacts the inner peripheral surface of the hollow fibers at a flow rate of 100 cm/s, and for at least 90 seconds and as long as 20 minutes. Water could be substituted by NaOH at a concentration of 0.5M. A solution of PFSA and methanol is prepared. The PFSA and methanol mixture comprises 2.5 percent to 5 percent, by weight, PFSA. Of course, the remaining material is methanol and other solvents as provided by the manufacturer in their proprietary 5 percent PFSA solution. This mixture is introduced to coat the inner surface of the hollow tubes from alternately both directions, i.e., from the top of the module and up from the bottom of the module to provide a uniform coating of PFSA. The PFSA solution flows inside of the hollow tube at a specific flow rate of 50-200 cm/s and for an amount of time which is varied from 20 seconds to 5 minutes. It can be appreciated that the percentage of PFSA in the solution the flow rate and the coating time are related to provide a specific coating thickness of PFSA. If the solution concentration of PFSA is decreased with the flow rate constant, the coating time must be correspondingly increased to provide the same degree of coating. The PFSA solution is then introduced from the reverse direction. Specifically, if the PFSA solution was first introduced from the top of the module, the PFSA solution should be subsequently introduced from the bottom of the bundle. The flow of the PFSA solution first in one direction and then in another direction is important to achieve a uniform coating of PFSA. Next, the PFSA solution must be dried. This can be accomplished by several methods. The drying can be achieved by leaving the bundle hanging in the vertical direction and allowing the test module to dry. This could lead to a undesirable result because the PFSA solution, which is still wet, tends to migrate towards the bottom of the test module because of the gravity acting on the test module. Thus, the coating of PFSA tends to be thicker at the bottom of the bundle than the coating of the PFSA near the top of the bundle.

Another drying method is to pump air in pulses from the bottom of the module through the hollow portion of the fiber in a pulsing pattern until dry. This method counteracts the tendency of the PFSA to drift towards the bottom of the module.

A third procedure for drying is to place the bundle in an oven. The oven is heated, and the atmosphere which is within the oven is withdrawn. This method, however, does not overcome the tendency of the PFSA to migrate towards the bottom of the bundle.

A fourth and preferred procedure is to introduce an inert gas, such as $N_2$, into the hollow area of the fiber; first flowing in one direction, such as from the top of the bundle, and then flowing from the other direction, such as the bottom of the bundle. The amount of time in each direction is varied from 10 minutes to 35 minutes In addition, the lengths of time that the gas is introduced is varied from each end and could be unequal. For instance $N_2$ could be introduced from the top for 15 minutes and $N_2$ could be introduced from the bottom for 35 minutes.

The fifth method of drying the coating is applying an inert gas, such as $N_2$, at the bottom of the module and flowing $N_2$ through the hollow area of the fibers until the coating appears dry. The drying standard that Applicants employed was that the $N_2$ continues to flow for 3 minutes after liquid drops of the PFSA solution cease falling from the bottom of the bundle. Then, the $N_2$ is flowed through the hollow area for an additional amount of time in the reverse direction, i.e., introduced from the top and flows to the bottom as long as 10 minutes. It is recognized again that the amount of time that $N_2$ flows in one direction need not equal the amount of time that $N_2$ flows in the reverse direction. The rate for inert gas flow is set by its delivery pressure to the tube bundle which is typically 5 psig. The last two steps, the coating of PFSA solution and the drying of the module is advantageously repeated to achieve an additional layer of PFSA.

It is recognized that the invention is not limited to PFSA but could include other polymers such as previously mentioned.

EXAMPLE 2

The inner peripheral surface of the hollow fiber is coated by methanol, as in trial 15, for 10 minutes, and coated with water for 10 minutes. The inner peripheral area of the hollow fiber is treated with PFSA solution which is 3.5 percent solution for 5 minutes from one direction such as from the bottom of the module, and the PFSA solution of 3.5 percent coats the inner peripheral surface of the hollow fiber for 5 minutes in the other direction, i.e., indicated at the top of the module. $N_2$ purges the inner surface of the hollow fiber for 35 minutes to dry the coating in one direction, such as from the top. Again, $N_2$ purges the hollow area of the fiber for 15 minutes in the opposite direction, i.e., $N_2$ introduced from the bottom. The flowing of PFSA solution and the N$_2$ purge is repeated once. The test for effectiveness of the coating is to place a cap on one end of the tube bundle and couple an N$_2$ pressure source on the other end of the bundle thereby forming a so-called "dead-end" condition. Then the bundle is placed under water and pressure is applied. The procedure is similar to looking for leaks in a tire inner tube. A real leak (i.e., uncoated pore) gives big bubbles. When a test of N$_2$ gas at dead-end condition measures the effect, the N$_2$ gas is applied under a pressure of up to 40 psi, the outside cylindrical are has little bubble formation.

EXAMPLE 3

The inner peripheral surface of the hollow fibers are coated first with methanol, as in trial 11, for 10 minutes and subsequently coated with water for 15 minutes and coated with a 3.5 percent solution PFSA for 5 minutes in the first direction such as the top and fourth coated with PFSA in a 3.5 percent solution for 5 minutes. The inner peripheral area is purged with N$_2$ in one direction for 15 minutes and in a second direction for 35 minutes to dry the PFSA. The coating of PFSA solution and the N$_2$ purge is repeated once. When a test of N$_2$ gas at dead-end condition is introduced at a pressure of 20 psig, only a very small amount of bubbles appear on the outside area of the fibers. When a test solution is introduced at a pressure of 40 psi, additional bubbles are formed.

EXAMPLE 4

The inner peripheral surface of the hollow fibers is first coated by methanol for 5 minutes, as in trial 25, second, coated by water for 10 minutes, and third, coated by a 2.5 percent solution of PFSA in one direction such as the top for 5 minutes and last coated by a solution of PFSA of 2.5 percent for 5 minutes. The inner peripheral area is first purged by N$_2$ in one direction such as the bottom of the module until no more drops of liquid solution expel from the module, and N$_2$ is additionally purged for 3 minutes. Likewise the inside of the fibers in the bundle is purged by N$_2$ for 3 minutes from the other direction, such as from the top of the module. The flow of methanol and water PFSA solution and N$_2$ is at a rate of three quarters of the rate of used in Examples 2 and 3. The coating of PFSA and the N$_2$ purge is repeated.

EXAMPLE 5

In a fifth example, the inner peripheral surface of the hollow fibers is contacted first by methanol for 5 minutes, second by water for 10 minutes and third contacted with a 2.5 percent solution of PFSA for 5 minutes and in a direction such as the bottom of the module. The inner peripheral surface of the hollow fiber is contacted by a 2.5 percent solution of PFSA for 5 minutes in the reverse direction, i.e., from the top to the bottom. The hollow cylindrical area is purged from the bottom of the module by N$_2$ until no drops fall from the bottom of the module. The area continues to be purged by N$_2$ in the same direction, such as the bottom of the module, for an additional 3 minutes. N$_2$ purges the inner cylindrical area in a second direction, such as the top of the module, for an additional 3 minutes, the rate in this case being one-half of the rate of MeOH, H$_2$O, PFSA and N$_2$ in Examples 2 and 3. The coating of PFSA and purge of N$_2$ is repeated once. The results from Example 4 and Example 5 are similar. Then an N$_2$ pressure test is conducted by pressurizing the hollow fiber at 5 to 10 psig; bubbles on the outside of the fiber appear only at the ends of the fiber bundle near the ferrules, except for a few small bubbles which appear in the middle of the fiber bundle. When the N$_2$ pressure test gas is increased to 15 to 20 psig, larger bubbles appear at the ends, however, the bubble formation in the middle of the fiber bundle does not increase. The bubble formation at the end of the ferrules is attributed to improper preparation and handling of the fiber bundles at the ferrules. Thus, it is established that good results are obtained in Examples 4 and 5.

The drying gases are not limited to N$_2$; any inert gas such as carbon dioxide can be used. The temperatures of the drying gases may very substantially, however, good results are obtained by using gases which are at ambient temperature.

The depositable material which is deposited on the inner cylindrical area of the hollow fibers may not directly form the desired coating but rather may be a precursor for the coating. Thus the depositable material may be capable of reacting with one or more simultaneously or subsequently provided components.

The resultant coatings on the inner peripheral surfaces of the hollow fibers are relatively uniform over the length of the hollow fibers and throughout the bundle. Generally, the coating has an average thickness of approximately 7 μm. However, in any one coating the thickness may vary between 5 to 20 μm.

Advantageously, the coating is subsequently stabilized on the inner peripheral surface of the hollow fiber and does not unduly separate from the inner surface of the hollow fiber during storage or use of the hollow fiber. This stabilization can be assured by a subsequent heat treatment where the hollow fiber is baked for approximately one hour at an elevated temperature between 90° and 105° C.

The material used for this hollow fiber may be of solid, porous or non-porous, natural or synthetic substance. The selection of material for the hollow fiber may be based on heat resistance, solvent resistance, and or mechanical strength of the hollow fiber as well as other factors dictated by the process in which it will be used and thus the operating conditions to which it will be subjected. Preferably, the material used for the hollow fibers is an organic porous substance.

The following examples of suitable process of use are provided to further illustrate the invention but are not intended to be limitation of the invention. The present invention can be used for the separation of gas components, such as acid gases from hydrocarbons. It may also be used for facilitated transport and for liquid separations such as amino acids and olefin/alkane. It can be used in both pervaporation as well as conventional pressure and dialysis modes.

As used herein, all parts and percentages of liquids and solids are by weight and all parts and percentages of gases are by volume unless otherwise indicated.

It should be noted that the above description and the accompanying drawings are merely illustrative of the application of the principles of the present invention and are not limiting. Numerous other arrangements which embody the principles in the invention and which fall within the spirit and scope of the applied claims ma be readily devised by those skilled in the art.

We claim:

1. A process for coating the interior of hollow fibers, which fibers, when coated, are suitable for fluid and gas separations, comprising the steps of contacting a liquid selected from the group consisting of water, methanol and an aqueous solution of NaOH with the inner surface of the hollow fiber, subsequently flowing into the interior of said liquid contacted hollow fiber a polymer dissolved in a solvent which has been introduced at one end and exits at another end of said fiber to coat the inner surface of the hollow fiber with said polymer.

2. A process for coating the interior of hollow fibers, which fibers, when coated, are suitable for fluid and gas separations, comprising the steps of contacting the inner surface of the hollow fiber with a polymer dissolved in a solvent which has been introduced at one end and exits at another end to coat the inner surface of the hollow fiber with said polymer dissolved in a solvent further comprising subsequently introducing the polymer dissolved in a solvent from said other end to flow thorough the hollow fiber thereby uniformly coating the inner surface of the hollow fiber with said polymer in a solvent.

3. A process for coating the interior of hollow fibers, which fibers, when coated, are suitable for fluid and gas separations, comprising the steps of contacting the inner surface of the hollow fiber with a polymer dissolved in a solvent which has been introduced at one end and exits at another end to coat the inner surface of the hollow fiber with said polymer dissolved in a solvent further comprising the step of flowing methanol through said hollow fiber prior to introducing the polymer.

4. A process for coating the interior of hollow fibers, which fibers, when coated, are suitable for fluid and gas separations, comprising the steps of contacting the inner surface of the hollow fiber with a polymer dissolved in a solvent which has been introduced at one end and exits at another end to coat the inner surface of the hollow fiber with said polymer dissolved in a solvent wherein the process further includes the step of flowing water through the hollow fiber prior to introducing the polymer.

5. A process as in claim 1 wherein said process further includes the step of drying the coated inner surface by an inert gas introduced in one end of the hollow fiber.

6. A process as in claim 4 wherein the process further includes drying said coated inner cylindrical area by an inert gas flowing in said another end of said coated fiber.

7. A process as in claim 1 wherein said fiber is a microporous fiber.

8. A process as in claim 1 wherein said fiber is a hydrophobic, polypropylene hollow fiber.

9. A process as in claim 1 wherein said polymer is an ion-exchange polymer.

10. A process as in claim 9 wherein said ion-exchange polymer is PFSA.

11. A process as in claim 1 wherein the polymer forms a coating having a thickness of less than 40 $\mu$m.

12. A process as in claim 2 wherein said polymer is an ion-exchange polymer.

13. A process as in claim 12 wherein said ion-exchange polymer is PFSA.

14. A process as in claim 3 wherein said polymer is an ion-exchange polymer.

15. A process as in claim 14 wherein said ion-exchange polymer is PFSA.

16. A process as in claim 4 wherein said polymer is an ion-exchange polymer.

17. A process as in claim 16 wherein said ion-exchange polymer is PFSA.

* * * * *